(12) United States Patent
Christensen et al.

(10) Patent No.: US 7,942,703 B2
(45) Date of Patent: May 17, 2011

(54) METHODS AND APPARATUS FOR A MODULAR UTILITY CONNECTION SYSTEM

(75) Inventors: Kent D. Christensen, Tucson, AZ (US);
Geoffrey C. Spalt, Tucson, AZ (US);
Peter F. Harrington, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 113 days.

(21) Appl. No.: 12/420,216

(22) Filed: Apr. 8, 2009

(65) Prior Publication Data
US 2009/0296319 A1 Dec. 3, 2009

Related U.S. Application Data

(60) Provisional application No. 61/058,466, filed on Jun. 3, 2008.

(51) Int. Cl.
*H01R 25/00* (2006.01)
(52) U.S. Cl. ........................................ 439/653; 439/652
(58) Field of Classification Search .................. 439/131, 439/535, 211–215, 652, 653
See application file for complete search history.

(56) References Cited

U.S. PATENT DOCUMENTS

| 5,149,277 | A | * | 9/1992 | LeMaster | 439/215 |
| 5,252,086 | A | | 10/1993 | Russell et al. | |
| 5,721,934 | A | * | 2/1998 | Scheurich | 713/320 |
| 5,888,078 | A | * | 3/1999 | Lecreux et al. | 439/131 |
| 6,045,755 | A | * | 4/2000 | Lebl et al. | 436/174 |
| 6,315,604 | B1 | * | 11/2001 | Lee | 439/535 |
| 6,445,087 | B1 | * | 9/2002 | Wang et al. | 307/40 |
| 6,735,705 | B1 | * | 5/2004 | Egbert et al. | 713/300 |
| 6,746,279 | B1 | * | 6/2004 | Lopez | 439/620.01 |
| 2004/0219828 | A1 | * | 11/2004 | Pulyk | 439/535 |

FOREIGN PATENT DOCUMENTS

| DE | 3408298 A1 | 9/1985 |
| DE | 10107912 A1 | 10/2001 |
| FR | 1092856 A | 4/1955 |
| FR | 2760905 A | 8/2009 |
| WO | 9956367 A | 11/1999 |

* cited by examiner

*Primary Examiner* — Briggitte R Hammond
(74) *Attorney, Agent, or Firm* — The Noblitt Group, PLLC

(57) ABSTRACT

Methods and apparatus for a modular utility connection system according to various aspects of the present invention include one or more utilities routed within a housing. The housing connects each of the routed utilities to a suitable preexisting source. The housing may also be linkably connected to one or more additional housings such that only a single housing need be connected to the preexisting source. The housing also comprises access points to each of the utilities allowing a user access to the utility via the housing rather than connecting directly to the source.

20 Claims, 1 Drawing Sheet

METHODS AND APPARATUS FOR A MODULAR UTILITY CONNECTION SYSTEM

CROSS-REFERENCES TO RELATED APPLICATIONS

This application claims the benefit of U.S. Provisional Patent Application 61/058,466, filed Jun. 3, 2008, and incorporates the disclosure therein in its entirety by reference.

BACKGROUND OF INVENTION

Workstations in manufacturing facilities are often arranged after careful planning taking into account factors such as processing steps, amount of distance traveled between steps, desired inventory levels, product type, and available space. Product changes, the introduction of a new product, or the desire to increase efficiency often necessitate the need to replan the factory layout. This may involve the creation of u-shaped assembly areas or extended linear flow areas from a previously configured area. This change may require that utilities such as electricity be re-routed. Moving utilities may result in expensive remodeling or time consuming work and affect the ability to rapidly respond to changing conditions. Restaging factory layouts also generates scrap and waste materials that must be disposed.

SUMMARY OF THE INVENTION

Methods and apparatus for a modular utility connection system according to various aspects of the present invention include one or more utilities routed within a housing. The housing connects each of the routed utilities to a suitable preexisting source. The housing may also be linkably connected to one or more additional housings such that only a single housing need be connected to the preexisting source. The housing also comprises access points to each of the utilities allowing a user access to the utility via the housing rather than connecting directly to the source.

BRIEF DESCRIPTION OF THE DRAWINGS

A more complete understanding of the present invention may be derived by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present invention.

DETAILED DESCRIPTION OF EXEMPLARY EMBODIMENTS

The present invention may be described herein in terms of functional block components and various processing steps. Such functional blocks may be realized by any number of hardware or software components configured to perform the specified functions and achieve the various results. For example, the present invention may employ various housings, connectors, couplings, e.g., such as 110V electrical connections, data connections, pneumatic quick connects, and the like, which may carry out a variety of functions. In addition, the present invention may be practiced in conjunction with any number of manufacturing facilities such as a clean room workstation or a test bench, and the system described is merely one exemplary application for the invention. Further, the present invention may employ any number of conventional techniques for installing and adapting workstations, reconfiguring work areas, and the like.

Figure 1:
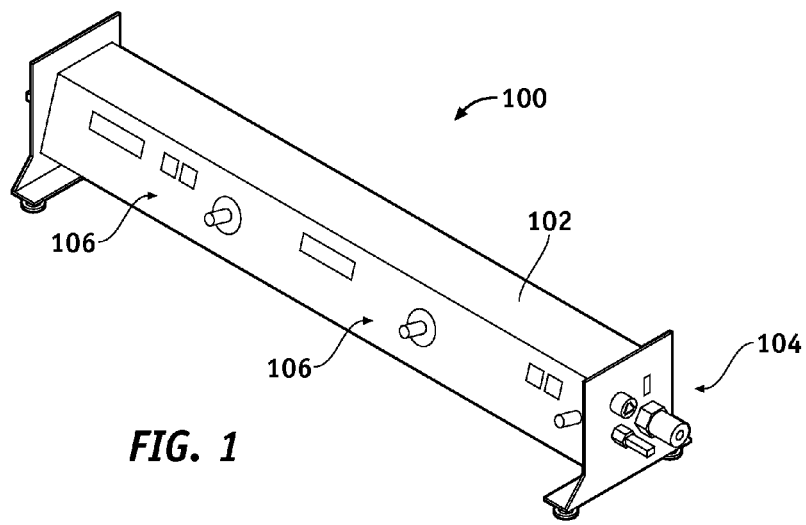
FIG. 1 representatively illustrates a utility grid in accordance with an exemplary embodiment of the present invention.

Various representative implementations of the present invention may he applied to any system for general assembly, manufacturing, engineering labs, test labs, clean rooms, and the like. Certain representative implementations may include, for example, a modular utility grid system for use in a clean room assembly area. Referring now to FIG. 1, methods and apparatus for a modular utility connection system according to various aspects of the present invention may operate in conjunction with a utility grid 100, a box 102, and a plurality of utilities. The box 102 may comprise a plurality of linkable connections 104 and a plurality of utility access points 106.

The box 102 at least partially encloses the plurality of utilities. The box 102 may comprise any suitable system configured to route and provide access to multiple utilities such as a box, a tube, a canister, or a molded container. The box 102 may also act as a protective covering and/or shield to the utilities. For example, the box 102 may reduce the potential for electrical shock by suitable routing of electrical wires enclosed within. The box 102 may also be used to protect, shield, or insulate a user or a workspace from stray frequencies, waves, or other interference associated with a particular utility such as electricity.

The box 102 may comprise any suitable material such as metal, plastic, elastomer, composite, or any suitable combination thereof. The box 102 may also be configured in any suitable size or dimension. The dimensions or inner volume of the box 102 may vary depending on the type and number of utilities located within the housing. In one embodiment, the box 102 may comprise a box having greater length than width. For example, the box 102 may comprise a housing ten feet long, eight inches wide, and fourteen inches high. In another embodiment, the housing may comprise a box two feet long, eight inches wide, and eight inches high. The box 102 may also comprise a removable or pivotable lid or cover allowing access to the plurality of utilities for purposes such as expansion, repair, or upgrade. For example, the lid may be connected to the housing by a hinge, locking tabs, clips, compression or any suitable combination.

The size of the box 102 may also be dependent upon the location where the box 102 will be used. For example, in one embodiment, the box 102 may be configured for installation on a workbench which may necessarily prescribe the dimensions of the box 102. In another embodiment, the box 102 may be configured for installation along a floor near one or more workstations. In this case, the dimensions of the housing may only be limited by the size of the room or amount of space allotted to the work area. Alternatively, the box 102 may be suitably configured to attach to a wall or a ceiling.

Figure 2:
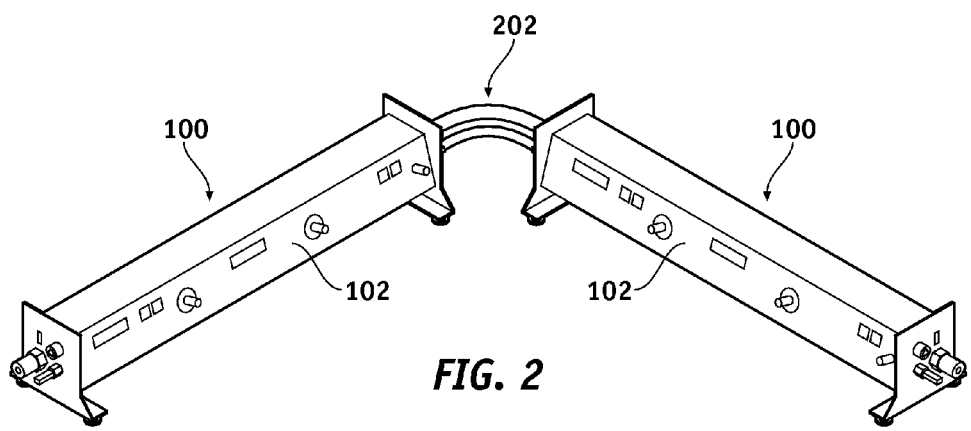
FIG. 2 representatively illustrates two utility grids linked together.

The box 102 may further be configured for linkable attachment to one or more additional boxes 102. For example, referring to FIGS. 1 and 2, the box 102 may comprise a plurality of linkable connections 104 suitably configured to connect the box 102 to various hard mounted utilities or to a similar set of linkable connections 104 on a second box 102.

By using a set of suitable adapters 202, several housings 102 may be linked in series thereby allowing for a customizable workspace. Linkable expansion of the box 102 provides for efficient restructuring of a workspace without the need to relocate or restructure preexisting hard mounted utilities.

Figure 3:
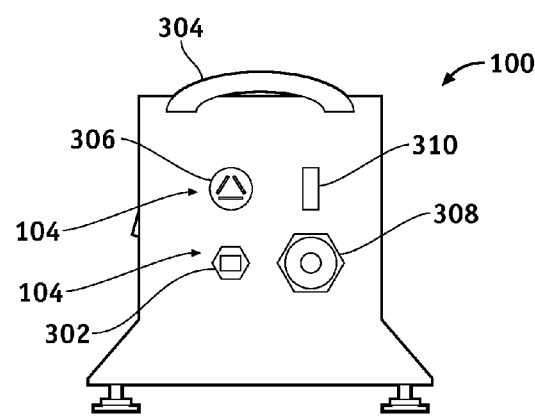
FIG. 3 representatively illustrates a linking interface.

Referring now to FIG. 3, one end of the linkable connections 104 may comprise a plurality of inlet connections on one end of the box 102 and a plurality of outlet connections on the opposite side of the box 102. For example, the linkable connections may include, but are not limited to, an RJ-45 port 302, an alternating current receptacle 306, and a quick connect for shop air 308. The box 102 may also comprise other elements such as a handle 304 and a fuse 310.

Referring again to FIG. 1, the box 102 may further comprise a plurality of utility connection points 106. The utility connection points 106 provide a technician, operator, machine, or other apparatus access to one or more of the available utilities. The utility connection points 106 may be unique to a given workstation or they may be generic providing openings in the housing to all available utilities. The box 102 may also comprise a plurality of covers, seals, or lockouts suitably configured to cover one or more of the utility access points preventing access to a particular utility and/or allowing for expansion. The box 102 may also be configured to provide utility connection points 106 on more than one side of the box 102 or to more than one workstation. For example, in one embodiment, the box 102 may be configured to provide utility access to multiple workstations located on either side of the box 102.

The box 102 may be suitably adapted to provide modular and expandable access to multiple utilities. For example, the box 102 may be adapted to provide electrical power in various modes such as 110V and 220V. The box 102 may also be adapted to provide a specific level of electrical service. For example, in one embodiment, the box 102 may be configured with between 2 and 10 standard 110V electrical sockets while also providing up to 50 amps of available current. In another embodiment, the box 102 may be configured to provide alternating and/or direct current. In yet another embodiment, the box 102 may be configured with multiple independent circuits so that each workstation accessing the utility grid 100 is unaffected by power requirements of another workstation. The housing may also comprise an uninterruptable power supply to protect against power loss from the main electrical source.

The box 102 may further be configured with a data link such as a telephone or Ethernet connection. For example, the utility connection points 106 may comprise one or more data connections such as RJ-11, RJ-14, RJ-25, or RJ-45. In one embodiment, the box 102 may comprise a 10/100BaseT Ethernet port switch which provides a connection point to each workstation using the utility grid 100. In an embodiment where the utility grid 100 is configured for installation on a single work bench, there may be two RJ-45 connections located on the exterior of the box 102, one for the user and one for the connection between the box 102 and the hard mounted source.

The box 102 may also be configured to provide one or more types of air service such as compressed air, high pressure gas, or a vacuum. For example, in one embodiment, the box 102 may be configured with a vacuum system that is connected to a larger integrated system within a manufacturing facility thereby allowing an operator to remove foreign object debris during a manufacturing process. The box 102 may also be configured to control the flow rates or volume of an available air service.

In operation, the utility grid 100 may be installed in an assembly area, manufacturing facility, or the like and be used to provide a single modular access point for a plurality of utilities. The utility grid 100 may comprise a box 102 configured such that the plurality of utilities may be routed through the interior of the box 102. The number and type of utilities present may be predicated on the type of facility, the work being done, or the difficulty in re-routing hard mounted utilities such as electricity, specialized pneumatic systems, or liquid delivery systems.

The utility grid 100 may also be configured to linkably connect to one or more other utility grids 100 such that an entire assembly area may be laid out in a non-permanent manner and without the need for individual hard mounted utility sources. In one embodiment, the utility grids 100 may be linked in series by suitable adapters 202. Modular connection in this manner may provide an efficient method of altering the layout of a working area without the need for expensive or timely re-routing of existing utility services. For example, if a product line is altered or a new product line is introduced necessitating the need to replan the assembly area, the utility grid 100 may simply be moved to a new location and then reconnected to the main utility services.

Prior to use, the utility grid 100 may be positioned within an area defining one or more workstations. Alternatively, the utility grid 100 may he placed at a location as an access point for general use. In the present embodiment, the utility grid 100 may be configured for use in a manufacturing environment such as a cleanroom and may be placed, set, attached, secured, or otherwise positioned in any suitable manner such as on a floor, a wall, a ceiling, a workbench, or the like.

After the location of the utility grid 100 is determined, a user may access the utilities in any suitable manner. For example, it the user is working with sensitive electronic equipment, he may connect to an ESD grounding plug, activate an ionizer, and plug in assembly tools to the appropriate electrical or pneumatic outlets, and access a computer system containing work instructions.

In the foregoing specification, the invention has been described with reference to specific exemplary embodiments. Various modifications and changes may be made, however, without departing from the scope of the present invention as set forth in the claims. The specification and figures are illustrative, rather than restrictive, and modifications are intended to be included within the scope of the present invention. Accordingly, the scope of the invention should be determined by the claims and their legal equivalents rather than by merely the examples described.

For example, the steps recited in any method or process claims may be executed in any order and are not limited to the specific order presented in the claims. Additionally, the components and/or elements recited in any apparatus claims may be assembled or otherwise operationally configured in a variety of permutations and are accordingly not limited to the specific configuration recited in the claims.

Benefits, other advantages and solutions to problems have been described above with regard to particular embodiments, however, any benefit, advantage, solution to problem or any element that may cause any particular benefit, advantage or solution to occur or to become more pronounced are not to be construed as critical, required or essential features or components of any or all the claims.

As used herein, the terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

The invention claimed is:

1. An expandable modular utility grid connection system, comprising:
   a freestanding container, comprising a plurality of feet disposed along a bottom surface of the freestanding container;
   a plurality of utilities at least partially enclosed within the container, wherein the utilities comprise electrical power, a data link, an air supply system, a vacuum system, and an electrostatic safety system;
   a first plurality of linkable connection points disposed along an exterior surface of the container configured to selectively connect each of the plurality of utilities to a utility source; and
   a plurality of utility connection points disposed along the exterior surface of the container configured to allow an operator to access the plurality of utilities.

2. An expandable modular utility grid connection system according to claim 1, wherein the container is adapted for use and operation in a clean room environment.

3. An expandable modular utility grid connection system according to claim 1, further comprising a second plurality of linkable connection points disposed along the exterior surface of the container opposite the first plurality of linkable connection points wherein the second plurality of linkable connection points is configured to:
   linkably connect to a second freestanding container in a series configuration; and
   connect the plurality of utilities to the second freestanding container.

4. An expandable modular utility grid connection system according to claim 1, wherein each of the first plurality of linkable connection points is configured to couple to an existing fixed utility source.

5. An expandable modular utility grid connection system according to claim 1, wherein the air supply system comprises a pressurized gas.

6. An expandable modular utility grid connection system according to claim 5, wherein the pressurized gas comprises nitrogen.

7. An expandable modular utility grid connection system according to claim 1, wherein the freestanding container further comprises a selectively accessible opening configured to provide access to an interior portion of the freestanding container.

8. An expandable modular utility grid connection system according to claim 1, wherein the freestanding container further comprises a handle disposed on the exterior surface of the freestanding container.

9. An expandable modular utility grid connection system according to claim 1, wherein the electrical power comprises:
   a first electrical service line of a first voltage; and
   a second electrical service line of a second voltage.

10. A linkably modular utility grid connection system for a clean room workcenter comprising:
    a first freestanding utility box configured for placement at a first workstation, comprising a plurality of feet disposed along a bottom surface of the freestanding utility box;
    a plurality of utilities enclosed within the utility box, wherein the utilities comprise electrical power, a data link, an air supply system, a vacuum system, and an electrostatic safety system;
    a first plurality of linkable connection points disposed along an exterior surface of the utility box configured to link each of the plurality of utilities to source for each of the plurality of utilities;
    a second plurality of linkable connection points disposed along an exterior surface of the utility box opposite that of the first plurality of linkable connection points, wherein the second plurality of linkable connection points are configured to link the plurality of utilities of the first utility box to a second freestanding utility box in a series configuration to support a second workstation; and
    a plurality of utility connection points disposed along the exterior surface of the utility box configured to provide access the plurality of utilities.

11. A connection system according to claim 10, wherein the each of the plurality of linkable connection points is configured to attach to an existing fixed utility source.

12. A connection system according to claim 10, wherein the freestanding utility box further comprises a selectively accessible opening configured to provide access to an interior portion of the freestanding utility box.

13. A connection system according to claim 10, wherein the freestanding utility box further comprises a handle disposed on the exterior surface of the freestanding utility box.

14. A connection system according to claim 10, wherein the electrical power comprises:
    a first electrical service line of a first voltage; and
    a second electrical service line of a second voltage.

15. A connection system according to claim 10, wherein the air supply system comprises a pressurized inert gas.

16. A connection system according to claim 15, wherein the inert gas comprises nitrogen.

17. A method of creating an expandable modular workstation, comprising:
    enclosing a plurality of utilities within a first freestanding housing, wherein:
      the plurality of utilities comprises electrical power, a data link, an air supply system, a vacuum system, and an electrostatic safety system; and
      the first freestanding housing comprises:
        a plurality of feet disposed along a bottom surface of the freestanding utility box; and
        a handle disposed on an exterior surface of the freestanding utility box;
    placing a linkable connection point on the exterior surface of the first housing for each of the plurality of utilities, wherein the linkable connection point connects the housing to at least one of a second housing and a source for each of the plurality of utilities; and
    placing a utility connection point on the exterior surface of the first housing for each of the plurality of utilities, wherein the utility connection point provides access to each of the plurality of utilities.

18. A method of creating a workstation according to claim 17, further comprising:
    enclosing a second plurality of utilities within the second housing, wherein the plurality of utilities comprises electrical power, a data link, an air supply system, a vacuum system, and an electrostatic safety system;

placing a linkable connection point on an exterior surface of the second housing for each of the second plurality of utilities; and linking the second plurality of utilities to the first plurality of utilities.

19. A method of creating a workstation according to claim 18, wherein the first and second housings are adapted for use in a clean room.

20. A method of creating a workstation according to claim 18, further comprising arranging the first and second housings to create a workspace.

* * * * *